United States Patent [19]

Brake et al.

[11] 4,331,175

[45] May 25, 1982

[54] MOUNTING OF PRESSURE VESSELS

[75] Inventors: Arthur L. Brake, Winscombe; David A. C. Harper, Bristol, both of England

[73] Assignee: Bristol Aerojet Limited, Avon, England

[21] Appl. No.: 187,067

[22] Filed: Sep. 15, 1980

Related U.S. Application Data

[63] Continuation of Ser. No. 963,731, Nov. 27, 1978, abandoned.

[51] Int. Cl.³ .............................................. F16L 37/24

[52] U.S. Cl. ................................ 137/322; 137/212; 222/3; 222/509; 222/518; 220/319; 251/149.5

[58] Field of Search ............... 137/321, 322, 323, 212; 220/319; 251/149.5, 297, 149.6, 104; 222/3, 509, 518

[56] References Cited

U.S. PATENT DOCUMENTS

| | | | |
|---|---|---|---|
| 2,557,807 | 6/1951 | Wagner | 222/3 |
| 2,638,914 | 5/1953 | Flaith et al. | 137/321 |
| 2,790,571 | 4/1957 | Flaith et al. | 137/321 |
| 2,888,276 | 5/1959 | Wei | 251/149.5 |
| 3,353,724 | 11/1967 | Johnston | 137/322 |
| 3,473,556 | 10/1969 | Johnson et al. | 137/322 |
| 3,549,121 | 12/1970 | Mercier | 251/149.5 |
| 4,181,143 | 1/1980 | Fallon | 137/322 |

FOREIGN PATENT DOCUMENTS

| | | | |
|---|---|---|---|
| 1402631 | 8/1975 | United Kingdom | 137/322 |

*Primary Examiner*—George L. Walton
*Attorney, Agent, or Firm*—Oblon, Fisher, Spivak, McClelland & Maier

[57] ABSTRACT

A combination of a pressure vessel for pneumatic fluids at pressures above 200 kilograms per square centimeter and a stationary mounting therefor, the pressure vessel having a neck which fits into a socket in the mounting and is retained therein by a locking mechanism, for example, a bayonet coupling or a polygonal flange on the neck passing through an aperture of the same shape in a flange in the socket. The neck contains a valve and the combination includes a mechanism for controlling the valve. Such mechanism may be in the neck or in the mounting and preferably comprises an axially movable valve operating member mounted by an external screw thread in a second member and coupled to a third member, such as a manually operable knob, by a coupling which transmits rotation, but not translation.

3 Claims, 17 Drawing Figures

MOUNTING OF PRESSURE VESSELS

This is a continuation of application Ser. No. 963,731, filed Nov. 27, 1978, now abandoned.

BACKGROUND OF THE INVENTION

1. Field of the Invention

This invention relates to pressure vessels for compressed gases at very high pressures of at least 200 kilograms per square centimeter.

2. Description of Prior Art

Hitherto, it has been usual for such pressure vessels (which are often known by the term of "bottles") to be mounted in a retaining structure and for them to be connected to a point of use by couplings which are separate from the mountings and which require the use of spanners or other tools for their attachment to the bottles. Examples of this kind of coupling are described in British Pat. No. 1,308,491 although the couplings therein are intended for pressures substantially lower than those contemplated for the present invention. While existing mounting and coupling systems are suitable for many purposes, the processes involved in changing an expended bottle for a full one—including release of the coupling from the expended bottle by the use of a spanner, release and removal of the expended bottle from the mounting, positioning and attaching of the new bottle in the mounting, and attachment of the coupling to the new bottle, again with the use of a spanner—take a considerable length of time during which the equipment using the gas will be deprived of such gas. While in some applications it may be possible to have a standby bottle already mounted and coupled, duplicate mountings and couplings are not always acceptable, for example for reasons of weight, space and cost. Also, the need to use a tool such as a spanner can be a disadvantage in adverse conditions, for example in cold climates where mitts must be worn, where dexterity may be reduced and spanners may be dropped or lost.

SUMMARY OF THE INVENTION

According to the present invention, a combination includes a pressure vessel for pneumatic fluids at pressures above 200 kilograms per square centimeter and a stationary mounting therefor; the pressure vessel having a neck containing a valve; and the mounting having a socket to receive the neck, a locking mechanism for retaining the neck in the socket, and a mechanism for controlling the valve.

The invention thus provides for a gas bottle a combined mounting and discharge valve so that the bottle can, in effect, be "plugged-in" to the mounting thus effecting mounting and connection of the flow coupling in a single, quick operation without the use of tools.

Quick-connect pipe or hose couplings are, of course, known and typical examples are those being described in British Pat. Nos. 1,463,205, 1,339,034, 1,264,890 and 1,212,777. These pipe couplings have, however, been widely used for a long time but their use in direct association with bottles has not been considered. The application of such a coupling to a bottle would, in any case, be expected to be solely in the development of the construction of the coupling whereas the present invention contemplates not only the provision of a releasable coupling incorporating a valve but also the provision of this coupling in a mounting, thus dispensing with the need for separate mounting means.

Preferably, the locking mechanism includes interengaging formations on the neck and the socket whereby the neck can be inserted into the socket with translational movement to a locking position and retained therein by relative rotation between the vessel and the socket of less than 180°. This provides for quick and easy bottle-changing. The locking mechanism may be a bayonet coupling in which one of the neck and socket has radial pins and the other has L-shaped grooves to receive the pins, the closed ends of the grooves having recesses whereby relative axial movement between the locked neck and socket is required before relative rotational movement is possible. This reduces the risk of accidental release of the bottle and, since gas pressure will press the pins into the recesses, removal of the bottle with the valve open will be difficult or impossible. In another construction, the formations include a non-circular radially outwardly extending flange on the neck and a radially inwardly extending flange in the socket having a non-circular aperture through which the flange on the neck can pass or not pass depending on the rotational orientation of the two flanges. This provides a strong coupling which is simple to manufacture and to operate. Preferably, the flange on the neck has the shape of a regular polygon and the aperture has the same shape and the flange in the socket has, on its side remote from the entry side, pockets to receive the corner portions of the flange on the neck. This again prevents removal of the bottle with the valve open.

In a preferred construction, the valve control mechanism includes a valve operating element which is movable in directions which are axial of the neck when the vessel is locked in the mounting to operate the valve; a screwthread which couples the valve operating element to a second element so that relative rotation between the two elements produces axial movement of the valve operating element; and a coupling between the valve operating element and a third element which transmits rotational but not translational movement. The valve operating element and the second element may be located in the neck of the vessel, the third element being a manually rotatable element forming part of the mounting. Preferably, the coupling is formed by a ring of depressions on one of the valve operating element and the third element, the depressions facing axially of the neck of the vessel when the vessel is locked in the mounting, and detent elements on the other, the detent elements being engageable with the depressions, and a spring mechanism urging the detent elements axially into the depressions. Thus the bottle can be inserted into the mounting and the spring means will allow the detent elements to yield if there is a mis-mesh between the detent elements and the depressions, meshing occurring on initial rotation of the manually rotatable element. In another arrangement the valve operating element and the second element are located in the mounting, the second element is stationary and the third element is a manually rotatable element forming part of the mounting, while in a third arrangement the valve operating element, the second element and the third element form part of the mounting, the third element is stationary and the second element is a manually rotatable element.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
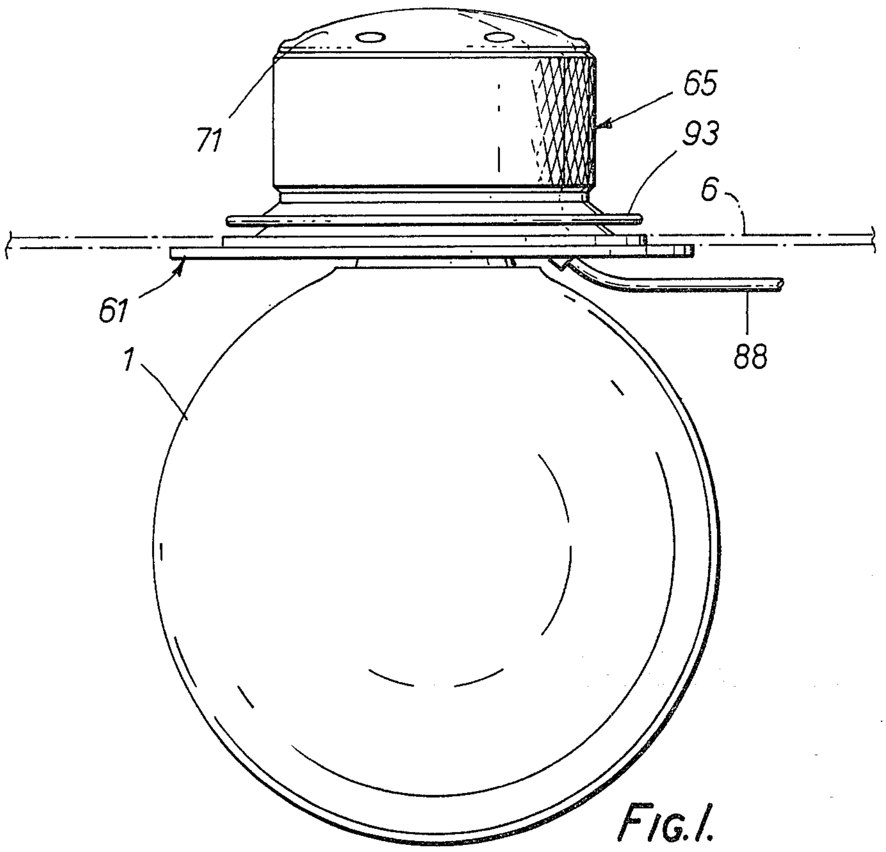
FIG. 1 is a side elevation of a pressure vessel received in and mounted on a mounting.
Figure 2:
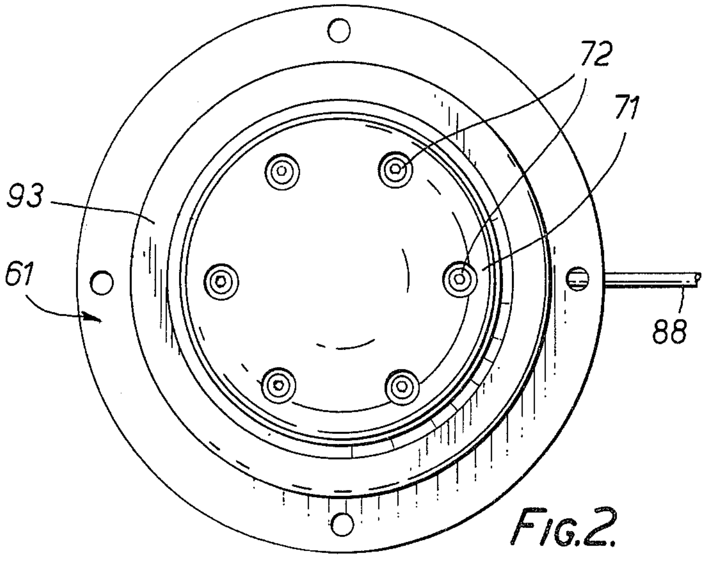
FIG. 2 is an end elevation of the mounting shown in FIG. 1.
Figure 3:
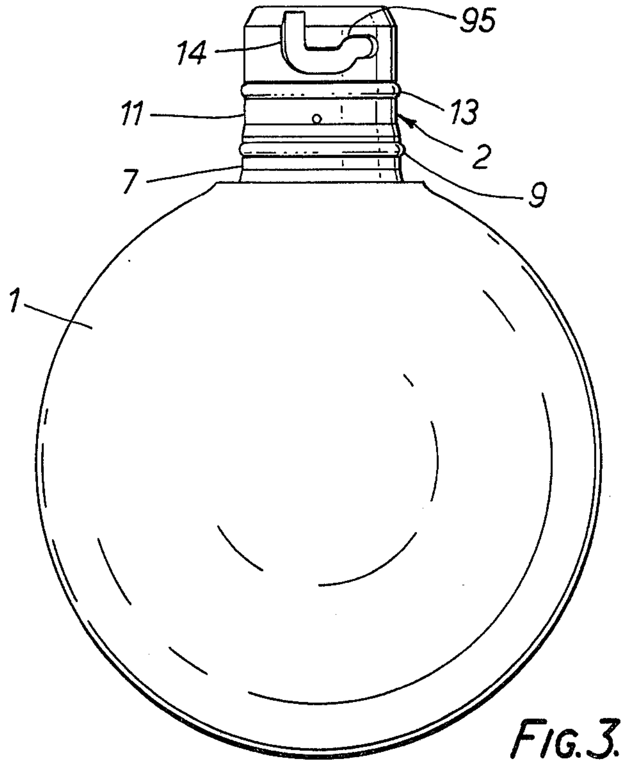
FIG. 3 is a side elevation similar to FIG. 1 of the pressure vessel alone.
Figure 4:
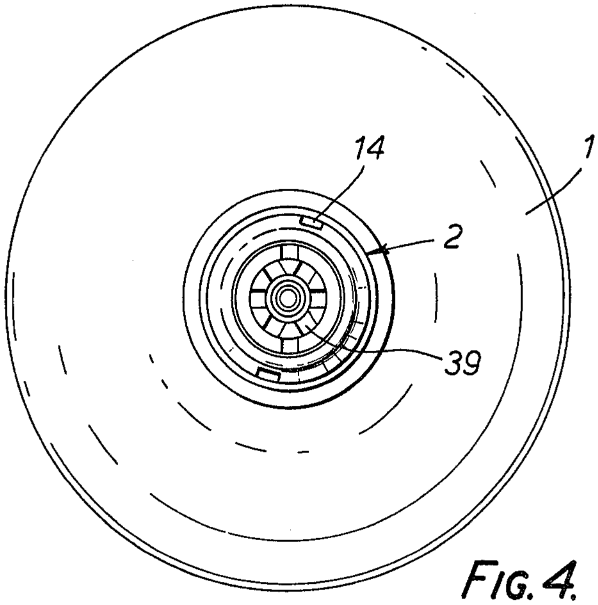
FIG. 4 is an end elevation similar to FIG. 2 of the pressure vessel alone.
Figure 5:
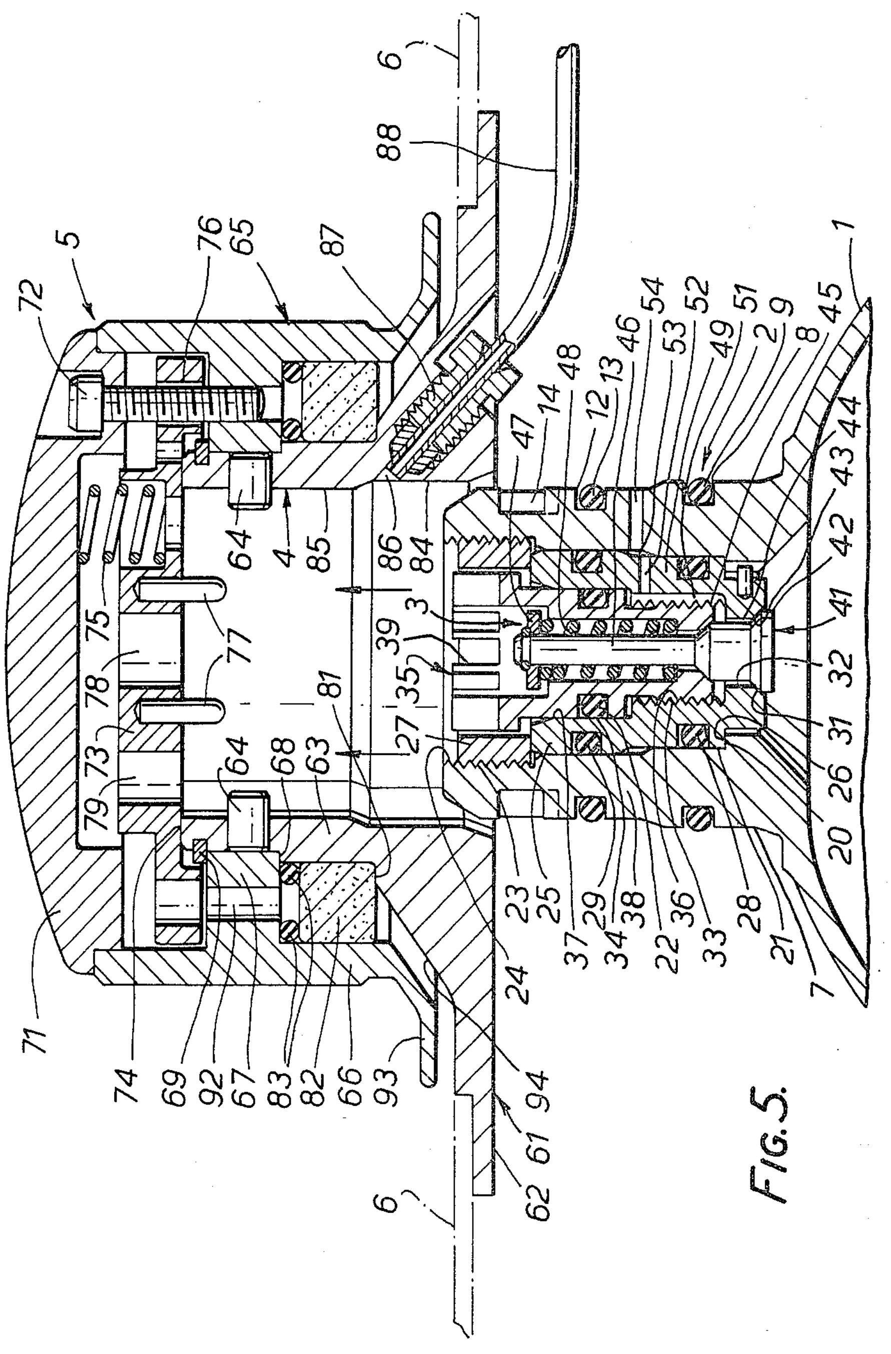
FIG. 5 is an axial section to a larger scale of the pressure vessel and mounting with the pressure vessel in a position in which it is ready to be offered up to the mounting.
Figure 6:
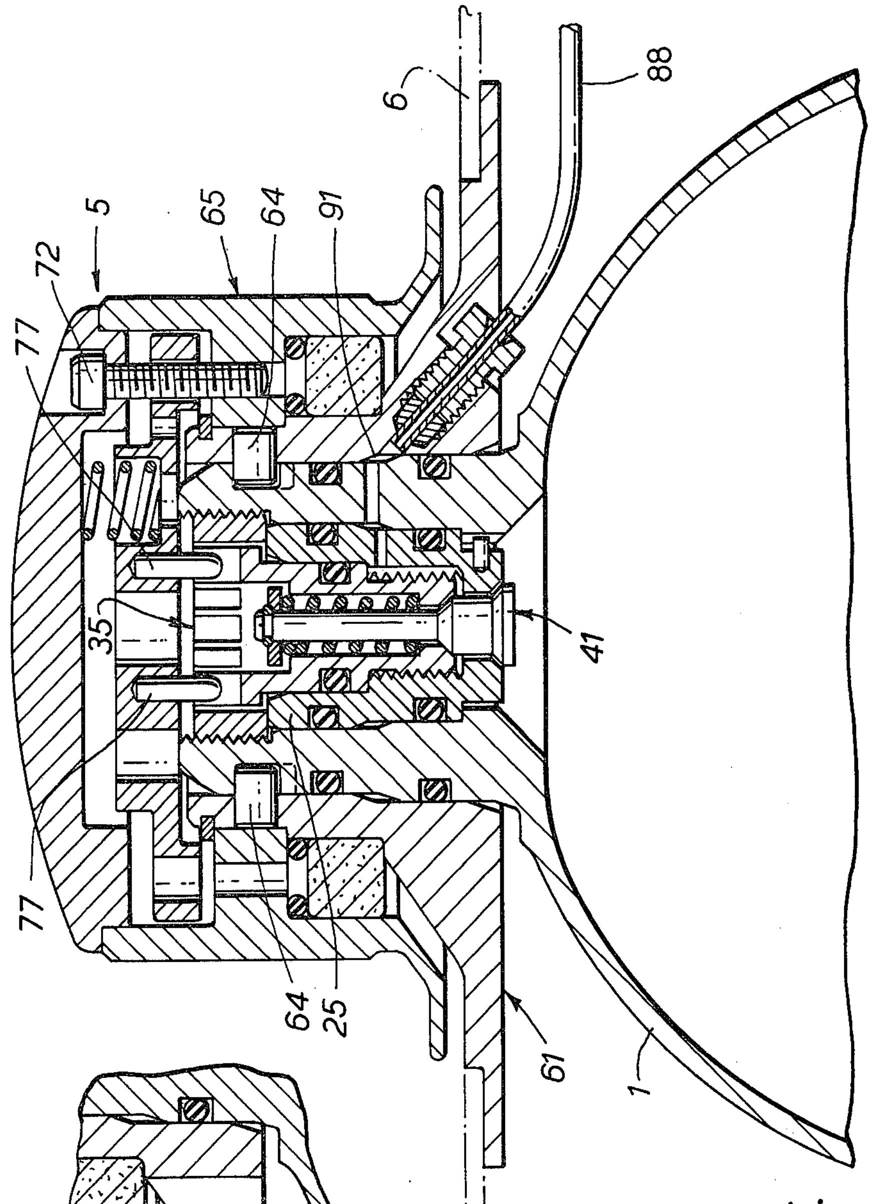
FIG. 6 is a view similar to FIG. 5 with the pressure vessel entered into the mounting and with the discharge valve in the pressure vessel opened.

FIGS. 1 to 6 and particularly FIGS. 5 and 6 show a spherical pressure vessel or bottle 1 intended to carry gas at a pressure of approximately 560 kilograms per square centimeter when fully charged and having a neck 2 containing a valve system 3 and insertable into a socket 4 of a mounting and valve operating assembly 5 carried on a bracket or wall 6.

The outer surface of the neck 2 has a first cylindrical surface 7 formed with a groove 8 containing an O-ring 9 and a second cylindrical surface 11 of smaller diameter than the first cylindrical surface 7 and also containing a groove 12 containing an O-ring 13. The smaller cylindrical surface 11 is formed with two generally L-shaped grooves 14 which form one half of a bayonet coupling.

The interior surface of the neck is formed with a shoulder 20, a first cylindrical surface 21, a second cylindrical surface 22 of larger diameter than the first cylindrical surface, and a third cylindrical surface 23 which is of greater diameter than the second cylindrical surface 22 and is formed with a female screw-thread 24. Fitted within the neck is a generally cylindrical seat member 25 having a shoulder 26 which abuts the shoulder 20 on the neck and which is held in position by a ring nut 27 having a male thread meashing with the thread 24 on the neck. The seat member has cylindrical surfaces corresponding to the first and second inner cylindrical surfaces 21 and 22 of the neck and formed with grooves containing O-rings 28 and 29.

The inner circumferential surface of the seat member 25 is formed at its inner end with a conical valve seat 31 followed by a neck portion 32. This in turn is followed by a first cylindrical surface 33 formed with a female screw-thread and a second cylindrical surface 34.

Fitting within the seat member 25 is a generally cylindrical valve operating member 35 whose external surface includes a first cylindrical portion 36 formed with a male screw-thread cooperating with the female screw-thread on the surface 33 of the seat member, and a second cylindrical surface 37 slidable within the second cylindrical surface 34 of the seat member and provided with a groove containing an O-ring 38. The upper end of the valve operating member is formed with castellations 39.

Axially movable within the valve operating member 35 and the valve seat member 25 is a valve member 41 having at its inner end a valve disc 42 formed with a first conical surface 43 cooperating with the valve seat 31 and a second conical surface 44 cooperating with a conical valve seat 45 at the inner end of the valve operating member 35. The valve member 41 also includes a stem portion 46 carrying at the outer end a collar 47. A compression spring 48 between the collar 47 and a shoulder 49 on the valve operating member 35 biases the valve member 41 in a direction such that the conical surface 43 engages the seat 45.

The seat member 25 is formed with a longitudinal groove 51 and a radial passage 52 which leads to an annular space 53 between the neck and the valve seat member. The neck has a radial bore 54 leading from this annular space 53 to the outside of the neck.

The mounting and valve operating assembly 5 include a stationary member 61 having an annular flange portion 62 which is bolted to the mounting wall 6, and a hollow boss portion 63 carrying pins 64 which cooperate with the grooves 14 in the neck of the pressure vessel and form the other half of the bayonet coupling. A rotatable knob 65 is mounted on the boss portion 63 and includes a generally cylindrical element 66 having an inwardly directed circumferential flange 67 which is retained between a shoulder 68 on the boss portion 63 and a circlip 69. The knob also includes a generally disc-shaped cover 71 which is connected to the cylindrical element 66 by screws 72.

Within the knob 65 is a disc 73 which is axially movable within the knob within limits determined by the cover 71 and the outer edge 74 of the boss portion 63, the disc being biased towards the boss portion by a plurality of compression springs 75. The disc 73 is held against rotation relative to the knob by the screws 72 which pass through apertures 76 in the disc. The disc carries a number of pins 77 and is formed with a central aperture 78 and a further ring of apertures 79.

Positioned between the flange 67 and a shoulder 81 on the boss portion 63 is a silencer 82 formed by an annular sintered body which is sealed against the flange 67 by O-rings 83.

The inner surface of the boss portion 63 has a first cylindrical portion 84 within the first cylindrical surface 7 on the neck of the pressure vessel is a close fit, and a second cylindrical portion 85 of smaller diameter and within which the second cylindrical surface 11 on the neck of the pressure vessel is a close fit. Leading from the first portion 84 is a passage 86 containing a non-return valve 87 and leading to a tube 88.

The operation of the pressure vessel and the mounting and operating assembly shown in FIGS. 1 to 6 will now be described. As shown in FIG. 5, the valve operating member 35 is in its outer position so that the second conical surface 44 on the valve member 41 is spaced from the valve seat 45 on the valve operating member, and the spring 48 together with the pressure of gas within the pressure vessel presses the first conical surface 43 on the valve member 41 on the valve seat 31 on the seat member 25, thus retaining pressure in the pressure vessel. When the pressure vessel is to be used, the neck of the pressure vessel is entered into the mounting and operating assembly so that the bayonet pins 64 enter the grooves 14 and the pressure vessel is then rotated until the pins 64 reach the ends of the grooves. As the pressure vessel is entered into the mounting assembly, the pins 77 on the disc 73 may immediately enter notches formed by the castellations 39 in the outer end of the valve operating member 35, but if they do not the springs 75 will become compressed and will cause the pins to enter notches in the castellations as soon as there is relative rotational movement between the valve operating member 35 and the disc 73. Entering the pressure vessel into the mounting assembly in this way establishes a path between the passage 86 and the exterior via an annular space 91 formed between the neck 2 and the boss portion 63, the bore 54, the annular space 53, the passage 52, the groove 51, the gap between the conical surface 44 and the valve seat 45, the interior of the valve operating member 35, the various apertures in the disc 73, a passage 92 through the flange 67, and the silencer 82.

When the contents of the pressure vessel are to be dispensed through the tube 88, the knob 65 is rotated, whereupon the following sequence of events will occur. Firstly, friction in the various parts will tend to rotate the pressure vessel relative to the boss portion 63 to ensure that the pins 64 are at the ends of the grooves 14 in case, due to inadvertence, this has not previously occurred. Thereupon, the dog clutch formed by the pins 77 and the castellations 39 will cause the valve operating member 35 to be rotated, causing it to be moved axially towards the interior of the pressure vessel because of the interaction of the threads on the surface 33 and on the portion 36. After some axial movement, the valve seat 45 will engage the second conical surface 44 of the valve member 41 to close the path referred to above extending from the passage 86 to the exterior. On further axial movement, the first conical surface 43 will move away from the valve seat 31 on the valve seat member 25, thus providing communication between the interior of the pressure vessel and the tube 88 through the groove 51, the passage 52, the space 53, the bore 54, the space 91, the passage 86 and the non-return valve 87; thus the gas is delivered to a point of use.

When the contents of the pressure vessel are substantially exhausted and it is required to remove the pressure vessel, possibly for replacement by a fully-charged vessel, the knob 65 is first rotated in the opposite direction to that previously described and this will result in the following sequence of events. Firstly, the first conical surface 43 of the valve member 41 will engage the seat 31 on the seat member 25 to close the pressure vessel. Then the seat 45 will move away from the second conical surface 44 on the valve member 41 to re-open the path previously described between the passage 86 and the exterior. Consequently, pressure contained within the assembly will slowly be dissipated through the silencer 82, this escaping gas being directed to travel parallel with the mounting wall 6 and thus away from the operator's hand on the knob 65 by a skirt 93 on the cylindrical element 66 of the knob and a cooperating surface 94 on the stationary member 61. When this gas has been dissipated, the pressure vessel can be rotated to release the bayonet coupling formed by the grooves 14 and the pins 64, and the pressure vessel removed. Because of the differential areas of the portion of the pressure vessel neck bounded by the first cylindrical surface 7 and the second cylindrical surface 11, any pressure within the assembly and particularly in the annular space 91 biases the pressure vessel in a direction away from the mounting assembly. It will be seen from FIG. 3 that the L-shaped grooves 14 are formed with cranks 95 so that in order to rotate the pressure vessel to unlock the bayonet coupling it is necessary to move the pressure vessel further into the mounting. Because of the force resulting from the pressure acting on the differential areas referred to, this cannot be achieved if the pressure within the assembly has not been largely dissipated and it is therefore not possible to remove the pressure vessel while substantial pressure remains.

It will be appreciated that various modifications may be made to the apparatus described. For example, it is not essential to provide the non-return valve 87 within the mounting assembly and such a non-return valve may be provided at the other end of the tube 88 adjacent the point of use or possibly omitted altogether, and in such cases gas within the tube 88 and possibly in the equipment using the gas will have to be dissipated through the silencer 82 before the pressure vessel can be removed.

Further modifications will now be described with reference to FIGS. 7 to 11 in which the same reference numberals are used as in FIGS. 1 to 6 but with the addition of reference letters.

Figure 7:
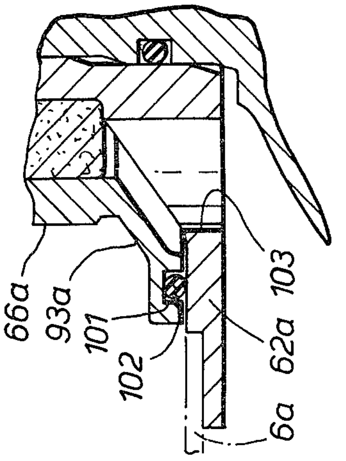
FIG. 7 is a detailed illustration similar to part of FIG. 5 showing a construction providing an alternative route for vented gas.

In the modification shown in FIG. 7, the skirt **93*a* on the cylindrical member 66*a* of the knob 65*a* is formed with a groove 101 containing an O-ring 102 which seals with the flange portion 62*a* of the stationary member 61*a* and there is a ring of apertures 103 through the stationary member so that venting of gases contained in the mounting assembly is to the same side of the mounting wall 6*a* as the pressure vessel instead of to the opposite side as in the construction shown in FIGS. 1 to 6**.

Figure 8:
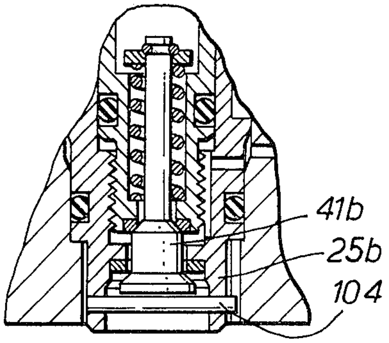
FIG. 8 is a view similar to part of FIG. 6 showing an alternative valve arrangement.

In the construction shown in FIG. 8, the valve seat member **25*b* extends inwardly of the pressure vessel beyond the inner end of the valve member 41*b* and a pin 104 extends diametrically across the extended part beyond the inner end of the valve member 41*b* so that it will be engaged by the valve member when the knob 65 is rotated to open the valve. The pin 104 provides a positive stop to limit inward movement of the valve member so that as torque continues to be applied to the knob 65 in the valve opening direction the seat 45*b* on the valve seat member 25*b* is forced tightly against the conical surface 44** on the valve member in order to effect a reliable seal.

Figure 9:
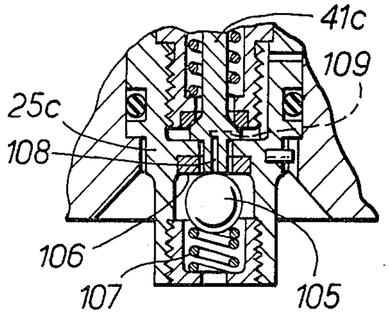
FIG. 9 is a view similar to FIG. 8 showing another alternative valve arrangement.

In the construction shown in FIG. 9, the valve formed by the first conical surface 43 on the valve member and the valve seat 31 on the valve seat member 25 are replaced by a ball valve consisting of a ball 105 which is biased against a seat 106 formed in the valve seat member 25*c* by a spring 107. The valve is opened by the valve member 41*c* moving the ball 105 against the bias of the spring 107 away from the seat 106 thus opening a passage through a longitudinally extending groove 108 and a radially extending groove 109 formed in the surface of the valve member 41*c*.

Figure 10:
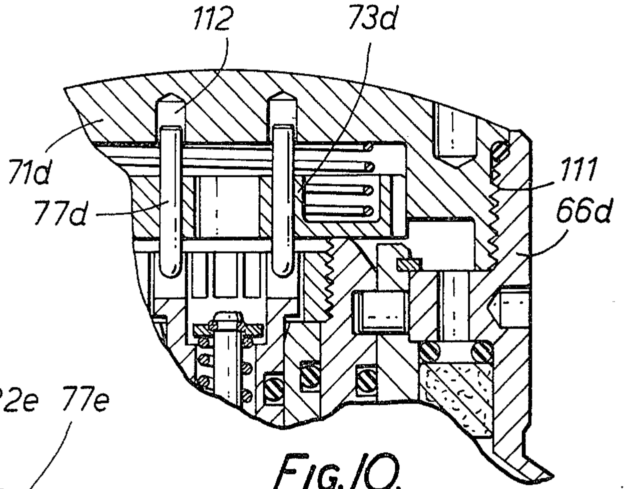
FIG. 10 is a view similar to another part of FIG. 6 showing an alternative clutch and spring assembly.

In the construction shown in FIG. 10 the disc 73*d* is retained in the cylindrical element 66*d* of the knob by means of a screw-thread 111 formed on the outer periphery of the disc 73*d* and engaging with a corresponding screw-thread on the inner circumferential surface of the cylindrical element 66*d*. The pins 77*d* project on both sides of the disc 73*d* and their outer ends extend into apertures 112 in the disc cover 71*d* to prevent relative rotation between the disc and the knob.

Figure 11:
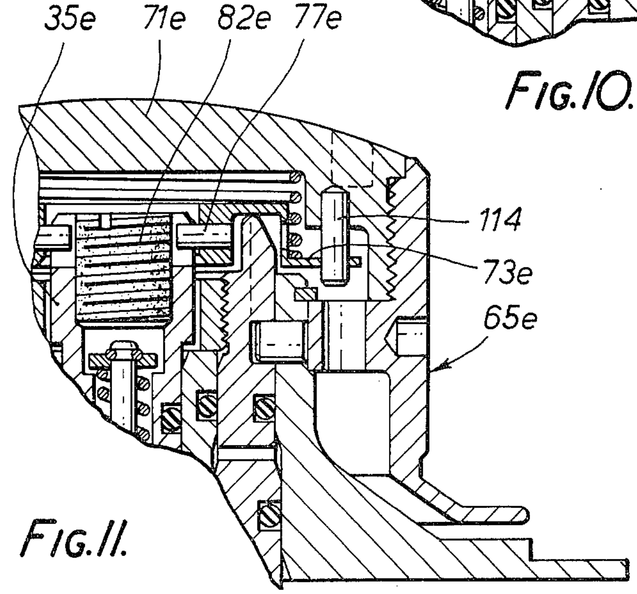
FIG. 11 is a view similar to FIG. 10 showing an alternative silencer, clutch and spring arrangement.

In the construction shown in FIG. 11 the annular silencer is replaced by a cylindrical silencer 82*e* mounted in the hollow interior of the valve operating member 35*e* and the dog clutch comprises pins 77*e* which extend from the disc 73*e* in radial directions instead of axially as in the previous constructions. The disc 73*e* is held against rotation relative to the knob 65*e* by pins 114 carried in the cover 71*e*.

The construction of spherical pressure vessel and mounting assembly shown in FIGS. 12 to 15 differs from that shown in FIGS. 5 and 6 primarily in two ways. Firstly, in the location of the venting valve and secondly in the means by which the bottle is retained in the mounting assembly.

The assembly shown in FIGS. 12 to 16 includes a pressure vessel or bottle 121 having a neck 122 within which there is screwed a generally cup-shaped valve seat member 123 having in its base a central aperture 124 surrounding a seat member 125. Trapped within the seat member 123 by a retaining member 126 is a valve ball 127 which is biased towards the seat 125 by a spring 128.

Figure 12:
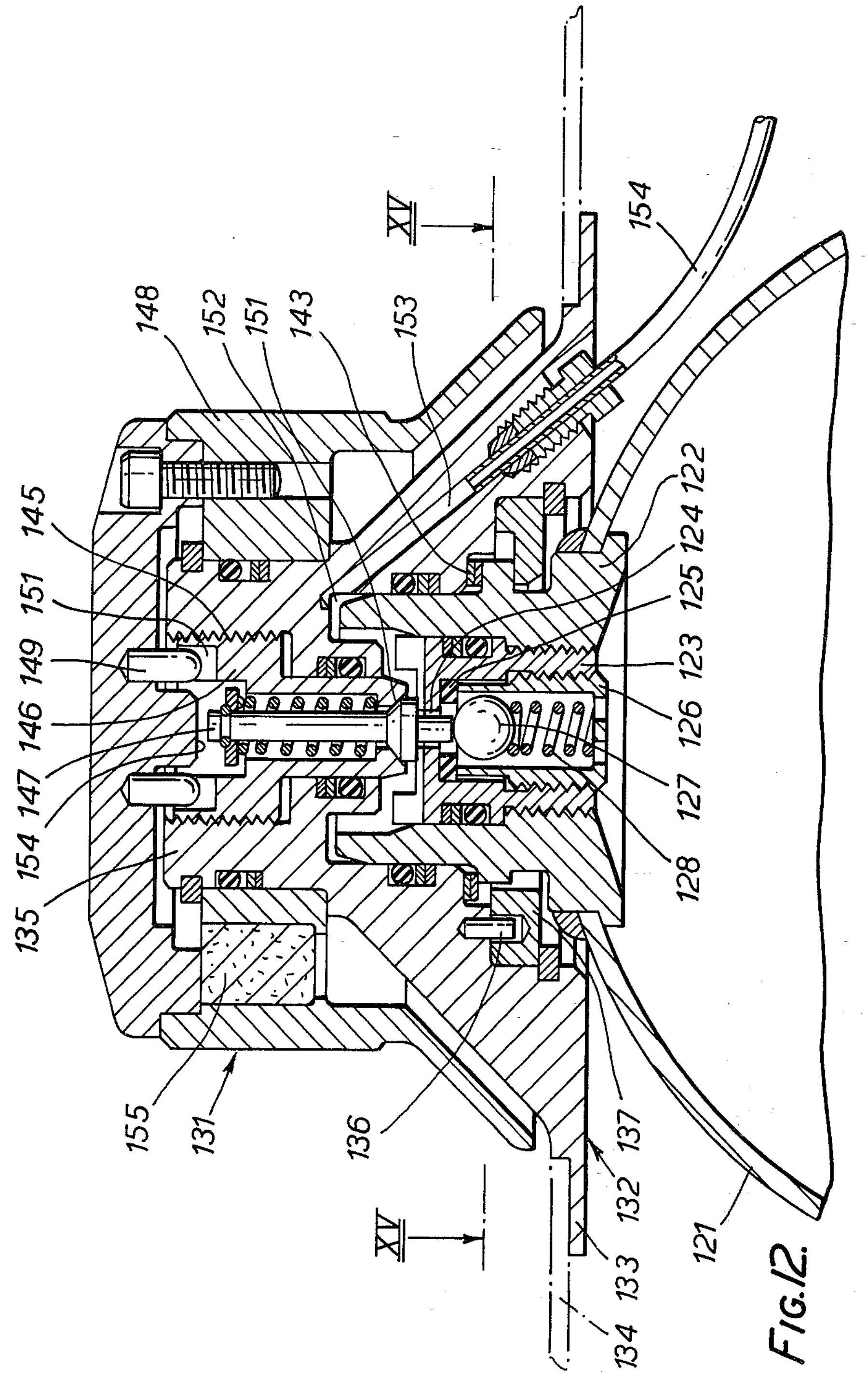
FIG. 12 is an axial section similar to FIG. 6 of a further combination of pressure vessel and mounting showing the neck of the pressure vessel inserted into the mounting.
Figure 14:
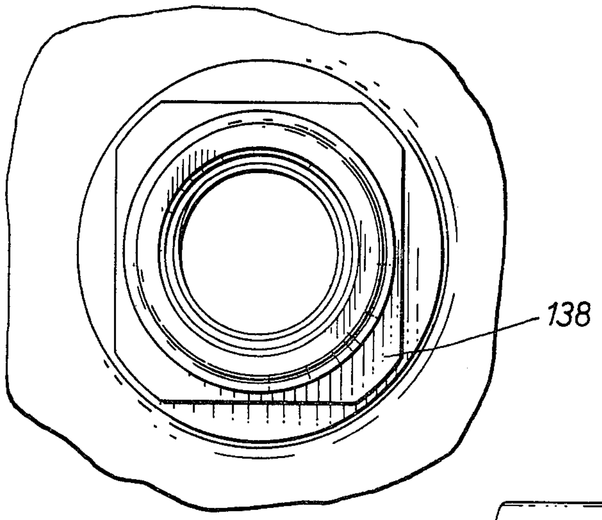
FIG. 14 is a plan view of the pressure vessel shown in FIG. 13.
Figure 13:
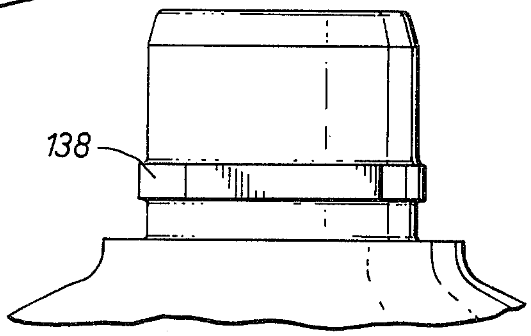
FIG. 13 is a side elevation of the neck of the pressure vessel shown in FIG. 12.
Figure 15:
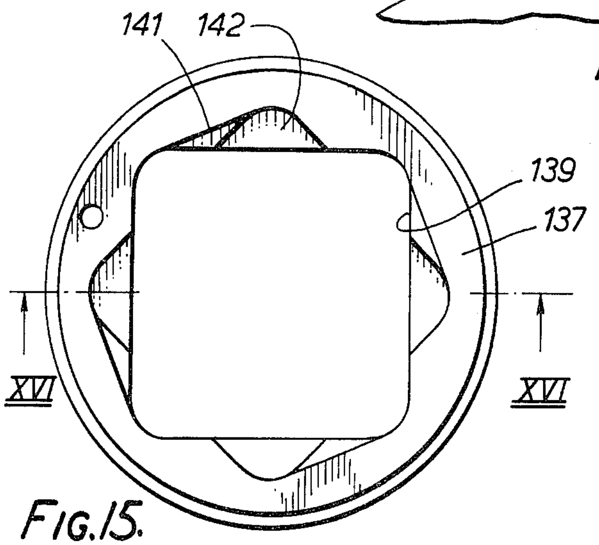
FIG. 15 is a fragmentary plan view on the plane XV—XV of FIG. 12 showing a bayonet plate.
Figure 16:
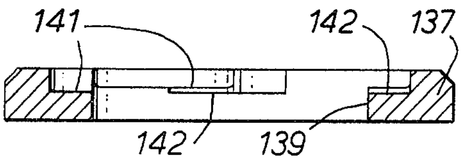
FIG. 16 is an axial section of the bayonet plate shown in FIG. 15 taken on the plane XVI—XVI.

The mounting and valve operating assembly 131 includes a stationary member 132 having an annular flange portion 133 which is bolted to the mounting wall 134 and a hollow boss portion 135 providing a socket into which the neck 122 of the bottle 121 can be entered. Seated against a rebate 136 on the boss portion 135 is a bayonet plate 137 whose shape can best be seen from FIGS. 15 and 16. This cooperates with a flange 138 on the neck of the bottle, the flange being best seen in FIGS. 13 and 14. The flange has an outline which is square with rounded corners and the bayonet plate 137 has an aperture 139 of corresponding shape. The upper surface of the plate 137 as seen in FIG. 12 is provided with four rebates or shelf portions 141, each of which is generally triangular in shape and extends from one of the corners of the aperture 139 towards one of the adjacent corners. Each of the rebates 141 is provided with a deepened portion 142 having the same shape as one corner of the aperture 139.

The bottle can be inserted into the socket of the mounting assembly by aligning the flange 138 on the bottle with the aperture 139 on the flange plate (in any of four positions) and pushing the neck through the flange plate until a wavy annular disc spring 143 is compressed. The bottle is then rotated through 45° until the corners of the flange 138 are located above the deepened portions 142 of the shelves 141. The spring 143 is then allowed to move the bottle downwardly as seen in FIG. 12 until the corners of the flange 138 rest in the deepened portions 142. In order to remove the bottle, it will be necessary again to move the bottle upwards as viewed in FIG. 12 so that the corners of the flange 138 clear the deepened portions 142.

Screw-threaded within a counterbore 145 in the boss portion 135 of the stationary member 132 is a valve operating member 146 within which is movable a valve member 147, similar to that shown in FIG. 6. A rotatable knob 148 similar to that shown in FIG. 6 is rotatably mounted on the boss portion 135 and rotation of the knob 148 can be transmitted to the valve operating member 146 through a dog clutch formed by pins 149 engaging in castellations 151 in the rim of the valve operating member 146.

The assembly shown in FIGS. 12 to 15 operates as follows. The bottle is first inserted into the mounting assembly in the manner described. The knob 148 is then rotated and this causes rotation of the valve operating member 146 to move the valve member 147 downwardly to move the ball 127 away from the seat 125 to open the discharge valve of the bottle. Gas from the bottle can therefore pass through the seat 125 into the space 152 within the stationary member 132 and thence through a passage 153 and a tube 154 to a point of use. When the bottle is to be changed, the knob 132 is rotated in the opposite direction thus raising the valve operating member 146 to allow the ball 127 to reseat on the valve seat 125. After this has occurred, the upper end of the valve member 147 (as seen in FIG. 12) will engage a surface 154 on the underside of the knob 131 and continued rotation of the knob will cause the seat 151 on the valve operating member 146 to separate from the valve member 147 to open a path from the space 152 through the interior of the valve operating member 146 and a silencer 155 to the exterior.

The bottle can then be removed and a new bottle substituted. On rotation of the knob 131 in the opposite direction, the seat 151 on the valve operating member 146 will initially seat on the valve member 147 to close the passage to the exterior through the silencer 155 and, after this has occurred, the valve member will again unseat the ball 127, to allow gas to pass out of the bottle.

Figure 17:
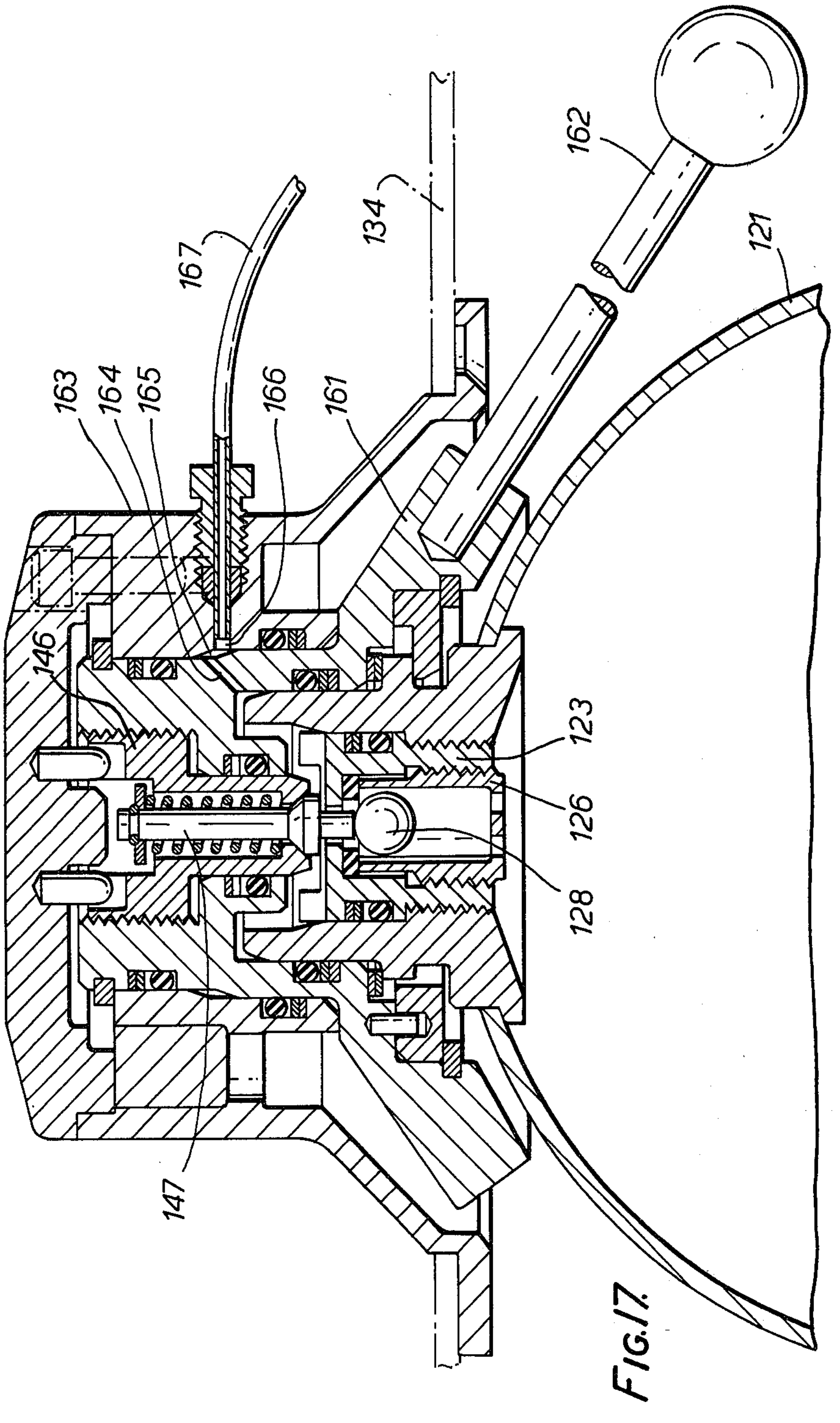
FIG. 17 is an axial section similar to FIGS. 6 and 12 of a further combination of pressure vessel and mounting.

In the construction shown in FIG. 17 the valve arrangement and the method by which the bottle is retained in the mounting assembly are basically similar to the construction shown in FIGS. 12 to 16. However in this case, the knob is stationary and is itself secured to the mounting wall 134 and there is within the knob a rotary member 161 carrying a handle 162. The bottle 121 is mounted in the rotary member so the bottle will rotate with the rotary member. The valve operating member 146 is held stationary by a dog clutch connection with the stationary knob 163 and axial movement of the valve operating member 146 is provided by rotation of the valve operating member 161. To provide a discharge path for the gas from the bottle, the rotary member 161 has a ring of bores 164 leading to an annular space 165 between the rotary member 161 and the knob 163. A passage 166 leads through the knob 163 to the discharge tube 167.

It will be appreciated that in the construction shown in FIG. 17 the valves are controlled from the same side of the mounting walls 134 as the bottle whereas in all the previous constructions, the control is from the opposite side.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A combination comprising:

a valve, said valve comprising a valve seat and a valve closure member cooperating with said valve seat;

a pressure vessel for pneumatic fluids at pressures above 200 kilograms per square centimeter and a stationary mounting therefor; said pressure vessel having a neck containing said valve; and said mounting having a socket to receive said neck;

locking means for retaining said neck in said socket; and means for controlling said valve, said valve control means comprising a valve operating element movable in directions which are axial of said neck when the vessel is locked in said mounting to operate said valve; a screw thread coupling said valve operating element to a second element so that relative rotation between said valve operating element and said second element produces axial movement of said valve operating element; and a coupling between said valve operating element and a third element which transmits rotational but not translational movement, and an operative connection between said valve operating element and said valve closure member; whereby rotation of said third element produces axial movement of said valve operating element to move said valve closure member away from said valve seat.

2. A combination according to claim 1 wherein said valve operating element and said second element are located in said neck of said vessel and said third element is a manually rotatable element forming part of said mounting.

3. A combination according to claim 2 wherein said coupling is formed by a ring of depressions on one of said valve operating element and said control member, said depressions facing axially of said neck of said vessel when said vessel is locked in said mounting, and detent elements on the other of said valve operating element and said control member, said detent elements being engageable with said depressions, and spring means urging said detent elements axially into said depressions.

* * * * *

UNITED STATES PATENT AND TRADEMARK OFFICE
CERTIFICATE OF CORRECTION

PATENT NO. : 4,331,175

DATED : May 25, 1982

INVENTOR(S) : ARTHUR L. BRAKE ET AL.

It is certified that error appears in the above—identified patent and that said Letters Patent is hereby corrected as shown below:

On the title page Insert

[30] -- Foreign Application Priority Data

November 25, 1977 [GB] United Kingdom.....49260 --

Signed and Sealed this

*Fifth* Day of *July 1983*

[SEAL]

*Attest:*

GERALD J. MOSSINGHOFF

*Attesting Officer* *Commissioner of Patents and Trademarks*